Oct. 25, 1932.  C. DRIEST ET AL  1,884,630
SCISSORS
Filed Oct. 2, 1931
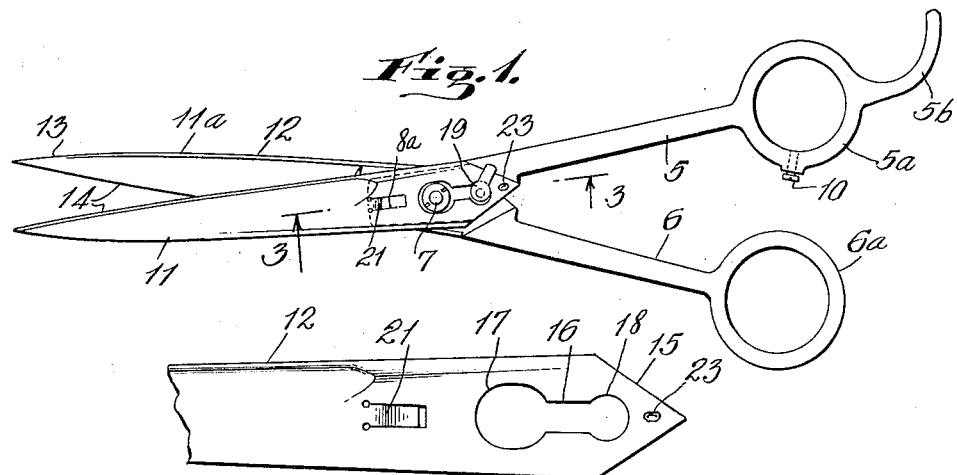
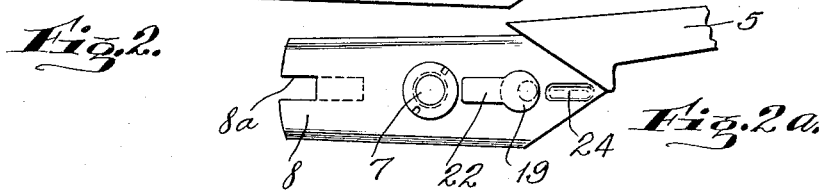
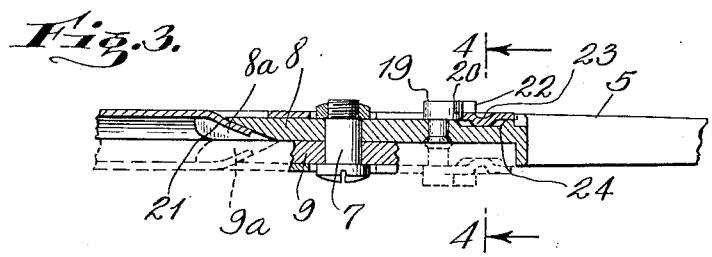
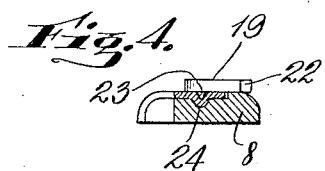
INVENTORS
*CHARLES DRIEST*
and *HARVEY D. MYERS*
BY
ATTORNEY Patented Oct. 25, 1932

1,884,630

UNITED STATES PATENT OFFICE

CHARLES DRIEST, OF MARLBORO, AND HARVEY D. MYERS, OF JERSEY CITY, NEW JERSEY; SAID DRIEST ASSIGNOR TO ROBERT G. WIENCKE, OF NORTH BERGEN, NEW JERSEY

SCISSORS

Application filed October 2, 1931. Serial No. 566,460.

This invention relates to scissors, and particularly to devices of this class employing pivotally coupled shanks and handle portions with blades detachably supported in connection with the shanks without disturbing their pivotal connection; and the object of the invention is to provide means whereby blades may be attached and detached with the shanks of the scissors without the use of tools or implements of any kind or class; a further object of the invention being to provide a blade securing means of such structure as to permit the proper adjustment and setting of the blades with respect to each other and especially in setting the free ends or tips of the blades in common alinement; a further object being to provide means for keying the blade against lateral movement with respect to the shank; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of our improvement are designated by suitable reference characters in each of the views, and in which:

Fig. 1 is a plan view of one form of scissors made according to the invention, showing the same in partially open position.

Fig. 2 is a bottom plan view of one end portion of a blade.

Fig. 2a is a plan view of the shank portion of the shears to which the blade shown in Fig. 2 is attachable.

Fig. 3 is a section on the line 3—3 of Fig. 1 on an enlarged scale; and,

Fig. 4 is a partial section on the line 4—4 of Fig. 3.

For the purpose of illustrating one method of carrying the invention into effect, illustration has been made of what is known as a barber scissors in the accompanying drawing, it being understood, however, that the invention is applicable to shears of any kind or class.

In the drawing, 5 and 6 represent the handle portions of a pair of shears, pivotally coupled together by a pivot pin 7 passed through short shank portions 8 and 9 on the handle members 5 and 6 respectively, the ends of the handle members terminating in finger loops 5a—6a, one of which includes a curved finger portion 5b. A screw 10 is adjustably supported in the loop 5a to limit the movement of the loops 5a—6a toward each other to control the movement of the cutter blades 11—11a with respect to each other.

Each of the blades 11—11a is of the same construction, so that the brief description of one will apply to both blades. Each blade is fashioned from sheet metal and the back side edge thereof is flanged as seen at 12 to a point adjacent the tip end thereof, as indicated at 13, note Fig. 1. The opposite side edge 14 of the blade is beveled and sharpened to form cutting edges. The inner ends of the blades terminate in beveled walls 15 which seat in the handles 5—6 of the shears. The inner end of the blade has an aperture 16 terminating at one end in a large, cylindrical opening 17 and at its other end in a smaller cylindrical opening 18. The opening 17 is adapted to receive the pivot pin 7, whereas the opening 18 receives the cam securing device 19, loosely riveted in each handle and shank portion 5—8, 6—9, in spaced relation to the pivot 7 as clearly seen in Fig. 3. The device 19 has a cam portion 20 which cooperates with the wall of the aperture 18 to draw the blade 11—11a backwardly in the direction of the handle members against a spring finger and retaining member 21 stamped from each blade forwardly of the aperture 17. The spring finger 21 operates in a notch or recess 8a or 9a formed in the free end of the shank portions 8—9 to aid in keying the blade against lateral movement on the shank and also upon the bottom wall of the notch in firmly clamping the blade in position through the action of the cam securing device 19.

The device 19 includes a radially projecting finger portion 22 which lies upon the upper face of the blade and by means of which said device may be moved into operative and inoperative positions, it being understood that said finger piece is movable into the position shown in Fig. 2a in the operation of attaching and detaching a blade with the shank of the scissors.

Other means for keying the blade against lateral movement is preferably provided, this means being in the form of a depression 23 formed in the blade outwardly of the aperture 18 adapted to enter a groove 24 formed in the upper surface of the respective shank portions 8—9 as clearly illustrated in Fig. 4 of the drawing.

In attaching the blades to the shank and handle members of the scissors, after the latter have been pivotally coupled by the pin 7, the device 19 of each handle portion or shank is moved into the position shown in Fig. 2, after which the spring finger 21 of each blade is placed in the notch of the shank portion, the pivots 7 and device 19 passing through the apertures 16—17—18 in the blade in this operation, and then each of the devices 19 is rotated by means of the finger piece 22 so as to draw the blades downwardly and backwardly by virtue of the cams 20 thereon. In this operation, the cutter blades will be adjusted to bring the tip ends thereof in common alinement.

It will be understood that while the blades may be secured in place with the devices 19 in the position indicated in Fig. 1 of the drawing, that said devices may be rotated to a greater degree to increase the camming action and insure positive mounting of the blades in connection with the shanks and handle members. The spring fingers 21 also serve to draw the adjacent cutting edges of the blades together into firm engagement so as to provide positive cutting or shearing operations, or in other words, proper functioning of the scissors at all times.

It will be understood that while we have shown certain details of construction for carrying our invention into effect, that we are not necessarily limited to these details, and various changes in and modifications of the construction herein shown and described may be made within the scope of the appended claims without departing from the spirit of our invention or sacrificing its advantages.

Having fully described our invention, what we claim as new and desire to secure by Letters Patent, is:

1. A tool of the class described comprising pivotally connected handle members, blade members formed independently of the handle members and attachable and detachable therewith without disturbing the pivotal connection of the handle members, interengaging means on the blade members and handle members for quickly attaching and detaching said blade members, said blade members being apertured to receive the pivotal connection of the handle members, said first named means comprising a spring tongue fashioned from said blade members and cooperating with the shank portions of the handle members, and securing devices rotatably supported in connection with the handle members and having cam portions cooperating with the blade members for adjustably securing the same in position.

2. A tool of the class described comprising pivotally connected handle members, blade members formed independently of the handle members and attachable and detachable therewith without disturbing the pivotal connection of the handle members, interengaging means on the blade members and handle members for quickly attaching and detaching said blade members, said blade members being apertured to receive the pivotal connection of the handle members, said first named means comprising a spring tongue fashioned from said blade members and cooperating with the shank portions of the handle members, securing devices rotatably supported in connection with the handle members and having cam portions cooperating with the blade members for adjustably securing the same in position, and said securing devices including radially extending fingers by means of which the same may be manually operated.

3. A tool of the class described comprising pivotally connected handle members, blade members formed independently of the handle members and attachable and detachable therewith without disturbing the pivotal connection of the handle members, interengaging means on the blade members and handle members for quickly attaching and detaching said blade members, said blade members being apertured to receive the pivotal connection of the handle members, said first named means comprising a spring tongue fashioned from said blade members and cooperating with the shank portions of the handle members, securing devices rotatably supported in connection with the handle members and having cam portions cooperating with the blade members for adjustably securing the same in position, said securing devices including radially extending fingers by means of which the same may be manually operated, and means for keying the blades against lateral movement with respect to the handle members.

4. In a scissors of the class described employing pivotally connected handle members having short shank portions, cutter blades detachably mounted in connection with the handle members, each of said blades including a coupling finger fashioned from the material thereof and engaging the shank portions of the handle members in coupling the same therewith, said blade being apertured at its inner end to receive a securing device passed through the aperture and cooperating with the blade in securing the same in position, and said device including a cam portion cooperating with the blade to adjust the position of the blade on the handle member.

5. In a scissors of the class described employing pivotally connected handle members having short shank portions, cutter blades detachably mounted in connection with the handle members, each of said blades including a coupling finger fashioned from the material thereof and engaging the shank portions of the handle members in coupling the same therewith, said blade being apertured at its inner end to receive a securing device passed through the aperture and cooperating with the blade in securing the same in position, said device including a cam portion cooperating with the blade to adjust the position of the blade on the handle member, and the inner end of the blade being provided with means for keying the same against lateral movement with respect to the handle member.

6. In a pair of shears employing pivotally coupled handle members having short shank portions, elongated cutter blades fashioned from sheet metal and projecting beyond the handle members and shank portions and detachably coupled therewith, interengaging elements on the blades and handle members for coupling the same together, means rotatably supported in the handle members cooperating with said blades for securing the same against displacement, and said last named means having cam portions engaging the blade in adjustably supporting the same in position.

7. In a pair of shears employing pivotally coupled handle members having short shank portions, elongated cutter blades fashioned from sheet metal and projecting beyond the handle members and shank portions and detachably coupled therewith, interengaging elements on the blades and handle members for coupling the same together, means rotatably supported in the handle members cooperating with said blades for securing the same against displacement, said last named means having cam portions engaging the blade in adjustably supporting the same in position, and said blades being apertured to receive the pivotal connection of the handle members.

8. In scissors of the class described employing pivotally connected handle members having short shank portions, cutter blades detachably mounted in connection with the outer faces of the shank portions of the handle members and projecting therebeyond, spring coupling fingers fashioned from the material of that part of the blades disposed on said shank portions and inwardly of the edges thereof and projecting from the inner surfaces of the blades and engaging the ends of the shank portions in coupling the blades with the handle members, securing devices projecting from the outer surfaces of the shanks of the handle members and passing through apertures formed in the blade in coupling the blades with said shanks, and means on said devices cooperating with the blades whereby the rotation of said devices will move the blades longitudinally of the shanks, said movement being controlled by the spring coupling fingers.

9. In scissors of the class described employing pivotally connected handle members having short shank portions, cutter blades detachably mounted in connection with the outer faces of the shank portions of the handle members and projecting therebeyond, spring coupling fingers fashioned from the material of that part of the blades disposed on said shank portions and inwardly of the edges thereof and projecting from the inner surfaces of the blades and engaging the ends of the shank portions in coupling the blades with the handle members, securing devices projecting from the outer surfaces of the shanks of the handle members and passing through apertures formed in the blade in coupling the blades with said shanks, means on said devices cooperating with the blades whereby the rotation of said devices will move the blades longitudinally of the shanks, said movement being controlled by the spring coupling fingers, and the ends of the shanks being recessed where said coupling fingers cooperate therewith.

10. In scissors employing holders having detachably coupled blades, a cutter blade fashioned from sheet metal, one side edge of the blade having a flange extending longitudinally thereof, the opposite side edge being fashioned to form a cutting edge, means at the inner end of the blade for facilitating the mounting and coupling of the blade with the holder, said means including an elongated aperture through which a coupling element on the holder is adapted to pass, and a spring finger stamped from the material of said blade adjacent the said aperture and inwardly of the side edges of the blade for tensionally supporting the blade in connection with the holder.

11. In scissors employing holders having detachably coupled blades, a cutter blade fashioned from sheet metal, one side edge of the blade having a flange extending longitudinally thereof, the opposite side edge being fashioned to form a cutting edge, means at the inner end of the blade for facilitating the mounting and coupling of the blade with the holder, said means including an elongated aperture through which a coupling element on the holder is adapted to pass, a spring finger stamped from the material of said blade adjacent the said aperture and inwardly of the side edges of the blade for tensionally supporting the blade in connection with the holder, and a bead formed at the inner end thereof to provide a key element engaging the holder to aid in preventing lateral displacement of the blade on the holder.

In testimony that we claim the foregoing as our invention we have signed our names this 30th day of September, 1931.

CHARLES DRIEST.
HARVEY D. MYERS.